(12) United States Patent  (10) Patent No.: US 7,986,434 B2
Quach  (45) Date of Patent: Jul. 26, 2011

(54) SYSTEM AND METHOD FOR COLOR SPACE TRANSFORMATION EMPLOYING THREE DIMENSIONAL LINEAR INTERPOLATIONS

(75) Inventor: Tony T. Quach, Anaheim, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 527 days.

(21) Appl. No.: 12/109,616

(22) Filed: Apr. 25, 2008

(65) Prior Publication Data

US 2009/0268255 A1 Oct. 29, 2009

(51) Int. Cl.
*G06F 15/00* (2006.01)

(52) U.S. Cl. ........ 358/1.9; 358/3.23; 358/525; 382/162; 382/167

(58) Field of Classification Search .................. 358/1.9, 358/3.23, 525; 382/162, 167
See application file for complete search history.

(56) References Cited

U.S. PATENT DOCUMENTS

| | | | | |
|---|---|---|---|---|
| 6,765,695 | B2 * | 7/2004 | Chen et al. | 358/1.9 |
| 7,843,465 | B1 * | 11/2010 | Shaick | 345/600 |
| 2006/0274386 | A1 * | 12/2006 | Wakazono et al. | 358/518 |
| 2007/0160285 | A1 * | 7/2007 | Gondek et al. | 382/162 |
| 2008/0218779 | A1 * | 9/2008 | Shirasawa | 358/1.9 |

* cited by examiner

*Primary Examiner* — Twyler L Haskins
*Assistant Examiner* — Michael Burleson
(74) *Attorney, Agent, or Firm* — SoCal IP Law Group LLP; Steven C. Sereboff; Jonathan Pearce (57) ABSTRACT

The subject application is directed to a color space transformation system and method employing multiple three-dimensional linear interpolations. First, N-channel multi-dimensional color space color image data is received into a color lookup table, which includes entries having values in a multi-dimensional color space corresponding to selected values in an N-channel multi-dimensional color space, with N being any integer greater than 2. Values in the color lookup table are then addressed in accordance with the received image data. Next, $2^N/8$ three-dimensional interpolations are then applied to an output of the lookup table corresponding to the received image data. Thereafter, $(2^N/8-1)*3$ linear interpolations are then performed among outputs from the three-dimensional interpolation. Transformed image data is then output in accordance with an output of the linear interpolation.

18 Claims, 6 Drawing Sheets

SYSTEM AND METHOD FOR COLOR SPACE TRANSFORMATION EMPLOYING THREE DIMENSIONAL LINEAR INTERPOLATIONS

BACKGROUND OF THE INVENTION

The subject application is directed generally to conversions of color image data between color spaces. The subject application is particularly suited to fast and efficient color space conversions having greater than three channels.

Electronic images frequently include color information. Such color information is typically encoded in a multidimensional color space, such as values in additive or subtractive primaries. Commonly used additive color spaces included red, green and blue (RGB), and are frequently used in displays such as monitors or projectors. Subtractive color spaces, such as cyan, yellow, magenta and black (CMYK,) are typically used in devices such as color printers.

When an electronic document, which is created or edited on a monitor and displayed in a color space, such as RGB, is to be output to hard copy, a conversion is made between color spaces. Such conversion is typically made with a color lookup table (CLUT), wherein an input value in one color space returns a table entry encoded in a second color space. Values between stored CLUT values are frequently obtained via a linear interpolation between closest table entries.

While CLUT color conversions are effective, they become extremely problematic when more than three channels of color are involved. By way of example, 15 linear interpolations are required for a 4-channel device color conversion, while 31 linear interpolations are required for a 5-channel device. Thus, substantial processing overhead is involved with higher channel numbers.

SUMMARY OF THE INVENTION

In accordance with one embodiment of the subject application, there is provided a system and method for conversions of color image data between color spaces.

Further, in accordance with one embodiment of the subject application, there is provided a system and method for fast and efficient color space conversions having greater than three channels.

Still further, in accordance with one embodiment of the subject application, there is provided a color space transformation system employing multiple three-dimensional linear interpolations. The system comprises a color lookup table including a plurality of entries having values in a multi-dimensional color space corresponding to selected values in an N-channel multi-dimensional color space, wherein N is defined as an integer greater than 2, and means adapted for receiving image data in the N-channel multidimensional color space. The system also comprises lookup means adapted for addressing values in the color lookup table in accordance with received image data and three-dimensional interpolation means adapted for applying $2^N/8$ three-dimensional interpolations to an output of the lookup table corresponding to received image data. The system further includes linear interpolation means adapted for performing $(2^N/8-1)*3$ linear interpolations among outputs from the three-dimensional interpolation means and means adapted for outputting transformed image data in accordance with an output of the linear interpolation means.

In one embodiment of the subject application, the system further comprises testing means adapted for testing a number of channels in received multi-channel image data, and means adapted for performing linear interpolation on multi-channel input data when a number of channels less than 4 is determined by the testing means.

In a further embodiment of the subject application, the system comprises means adapted for calculating a fraction value in accordance with received image data, means adapted for calculating an index value in accordance with received image data, and means adapted for calculating an offset value in accordance with a calculated fraction value, a calculated index value, and a dimension of the color lookup table. In this embodiment, the lookup means includes means for addressing values in the color lookup table in accordance with a calculated offset value.

In another embodiment of the subject application, the received image data is defined in an RGB color space and wherein the transformed image data is defined in CMYK color space.

In yet another embodiment of the subject application, each linear interpolation is completed on two distinct outputs from the three-dimensional interpolation means.

In one embodiment of the subject application, the system also comprises an input single dimensional lookup table and an output single dimensional lookup table. In this embodiment, input image data is received from the input lookup table, and wherein the output transformed image data is communicated to the output lookup table from which corresponding final output data is obtained according thereto.

Still further, in accordance with one embodiment of the subject application, there is provided a color space transformation method employing multiple three-dimensional linear interpolations in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for conversions of color image data between color spaces. In particular, the subject application is directed to a system and method for fast and efficient color space conversions having greater than three channels. More particularly, the subject application is directed to a color space transformation system and method that employs multiple three-dimensional linear interpolations. It will become apparent to those skilled in the art that the system and method described herein are suitably adapted to a plurality of varying electronic fields employing linear interpolation, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
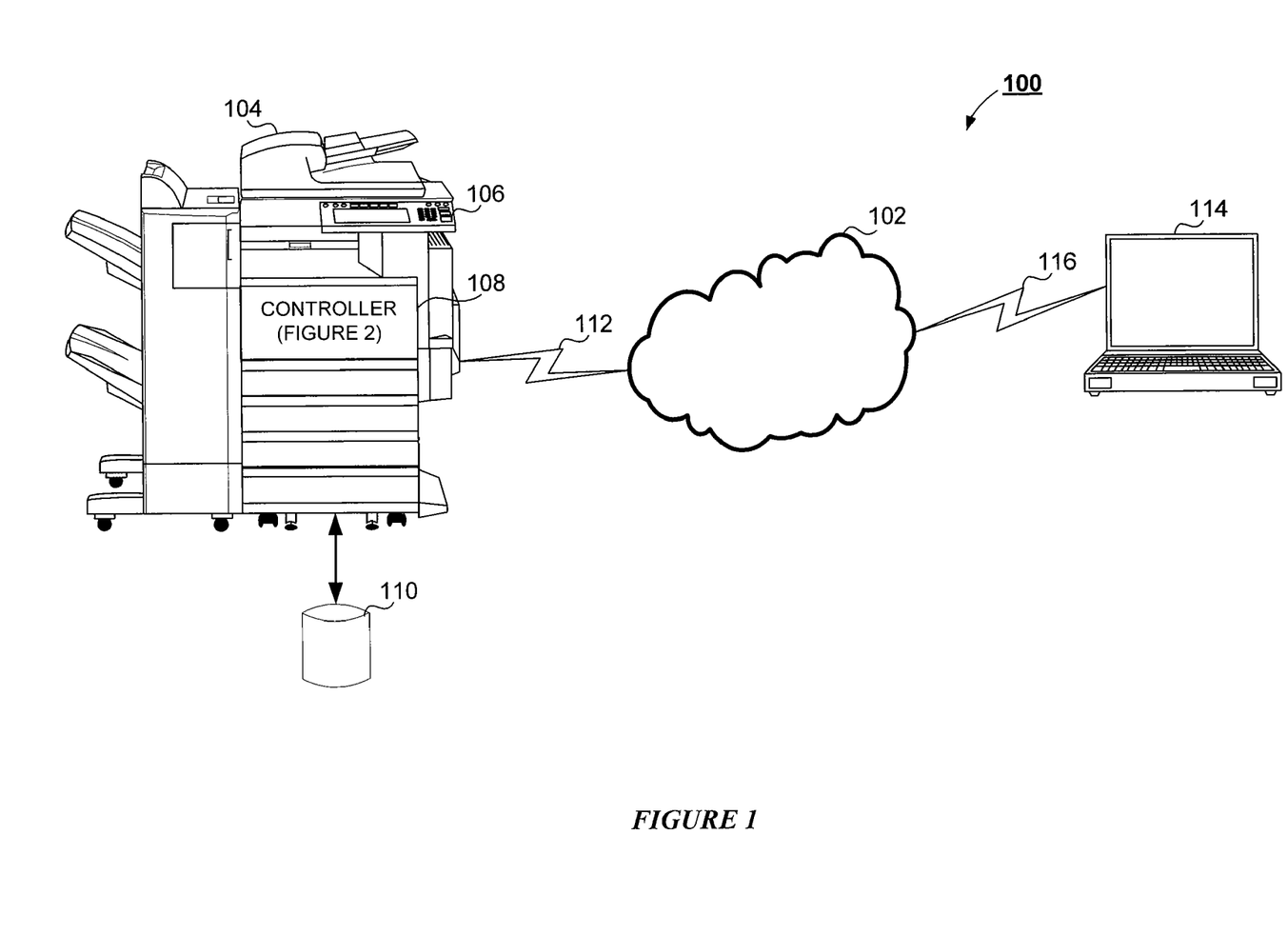
FIG. 1 is an overall diagram of a color space transformation system employing multiple three-dimensional linear interpolations according to one embodiment of the subject application.

Referring now to FIG. 1, there is shown an overall diagram of a color space transformation system 100 employing multiple three-dimensional linear interpolations in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the color space transformation system and method employing multiple three-dimensional linear interpolations of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The system 100 illustrated in FIG. 1 further depicts a user device 114, in data communication with the computer network 102 via a communications link 116. It will be appreciated by those skilled in the art that the user device 114 is shown in FIG. 1 as a laptop computer for illustration purposes only. As will be understood by those skilled in the art, the user device 114 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 114 is suitably adapted to generate and transmit electronic documents, document processing instructions, user interface modifications, upgrades, updates, personalization data, or the like, to the document processing device 104, or any other similar device coupled to the computer network 102.

Figure 2:
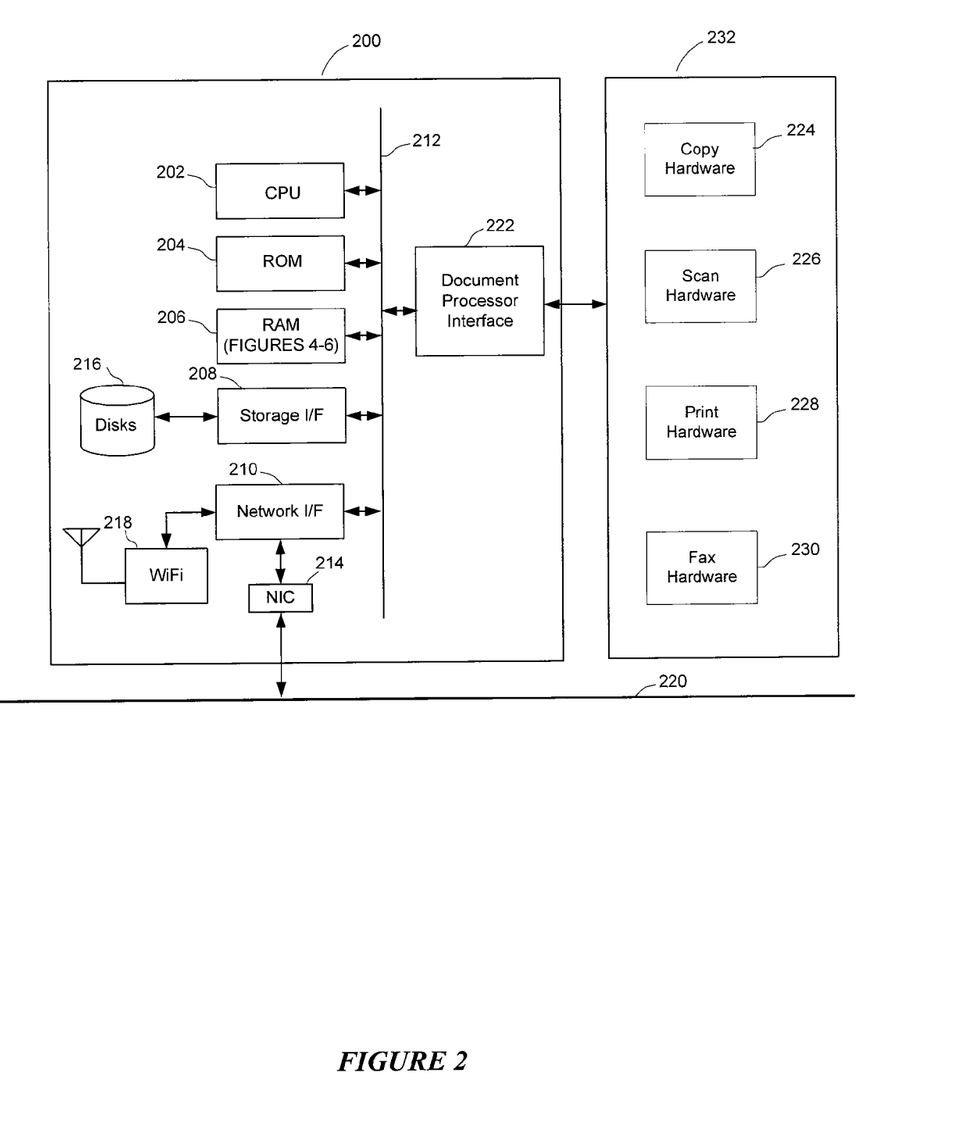
FIG. 2 is a block diagram illustrating controller hardware for use in the color space transformation system employing multiple three-dimensional linear interpolations according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by the processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
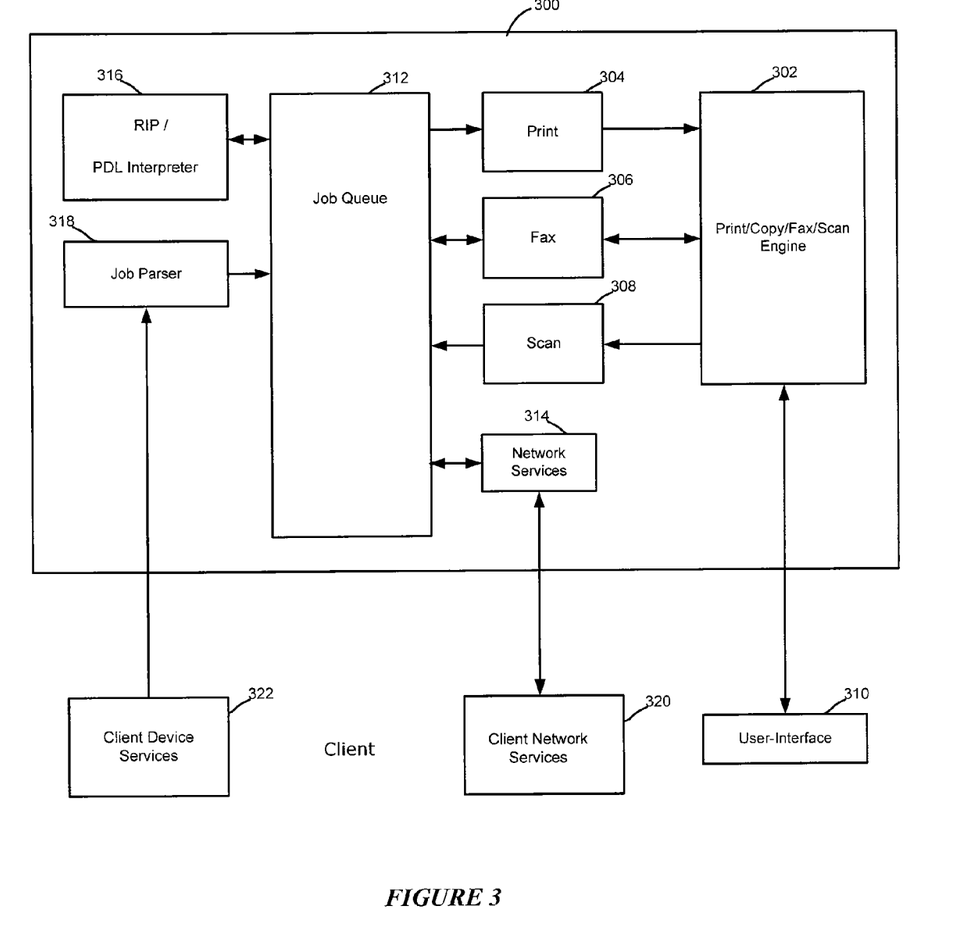
FIG. 3 is a functional diagram illustrating the controller for use in the color space transformation system employing multiple three-dimensional linear interpolations according to one embodiment of the subject application.

Functionality of the subject system 100 is accomplished on a suitable document processing device, such as the document processing device 104, which includes the controller 200 of FIG. 2, (shown in FIG. 1 as the controller 108) as an intelligent subsystem associated with a document processing device. In the illustration of FIG. 3, controller function 300 in the preferred embodiment includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are a subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as the print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

In operation, N-channel multi-dimensional color space color image data is first received into a color lookup table, which includes a plurality of entries having values in a multi-dimensional color space corresponding to selected values in an N-channel multi-dimensional color space, with N being any integer greater than 2. Values in the color lookup table are then addressed in accordance with the received image data. $2^N/8$ three-dimensional interpolations are then applied to an output of the lookup table corresponding to the received image data. $(2^N/8-1)*3$ linear interpolations are then performed among outputs from the three-dimensional interpolation. Transformed image data is then output in accordance with an output of the linear interpolation.

In accordance with one example embodiment of the subject application, N-channel multi-dimensional color space image data is received by the controller 108 into a color lookup table. The skilled artisan will appreciate that the received input image data is capable of being defined in an N-channel color space, such as, for example and without limitation, Red-Green-Blue (RGB) color space. It will be appreciated by those skilled in the art that the multi-channel image data is capable of originating from the user device 114, from a portable storage medium, from the data storage device 110, or the like. According to one example embodiment of the subject application, the multi-channel image data is received into a single dimensional lookup table, as will be appreciated by those skilled in the art. Input image data is then received by the controller 108 or other suitable component associated with the document processing device 104 from the single dimensional lookup table.

The number of channels (N) in the received image data is then tested by the controller 108 or other suitable component associated with the document processing device 104 so as to determine whether the number of channels (N) is greater than two channels, i.e. N>2. Upon a determination by the controller 108 that the received input image data has less than three channels, linear interpolation is performed on the multi-channel input data as will be appreciated by those skilled in the art. Transformed image data is then output in accordance with the output of the linear interpolation. The output transformed image data is then communicated to a single dimensional output lookup table, whereupon final output data is obtained by the controller 108 or other suitable component associated with the document processing device 104.

When it is determined that the received multi-channel input image data has more than 2 channels, e.g. N>2, a fraction value is calculated in accordance with the received image data. An index value is then calculated in accordance with the received image data. Using the calculated fraction value, the calculated index value, and a dimension of the color lookup table, an offset value is calculated by the controller 108 or other suitable component associated with the document processing device 104. Values in the color lookup table are then addressed in accordance with the calculated offset value. The controller 108 or other suitable component associated with the document processing device 104 then applies $2^N/8$ three-dimensional interpolations to an output of the lookup table corresponding to the received image data. $(2^N/8-1)*3$ linear interpolations are then performed among the outputs from the three-dimensional interpolations. Transformed image data is then output in accordance with the linear interpolations performed on the outputs from the three-dimensional interpolations. The output transformed image data is then communicated to a single dimensional lookup table and final output data is obtained therefrom.

It will be understood by those skilled in the art that the combination of three-dimensional interpolations reduces the number of linear interpolations required to be performed by the controller 108 or other suitable component associated with the document processing device 104. As set forth above, the number of three-dimensional interpolations required for an N-channel device is calculated as $2^N/8$ and the number of linear interpolations required for the N-channel device is calculated as $(2N/8-1)*3$. Thus, the skilled artisan will appreciate that two (2) three-dimensional interpolations ($2^4/8$) and three (3) linear interpolation (($2^4/8-1)*3$) are used for a four (4) channel device, i.e. N=4. For example, the document processing device 104 is capable of outputting data in CMYK color space. Similarly, those skilled in the art will understand that four (4) three-dimensional interpolations ($2^5/8$) and nine (9) linear interpolations (($2^5/8-1)*3$) are used for a five (5) channel device, i.e. N=5. A suitable example of a five-channel input is discussed below with respect to FIG. 5.

The offset values, or addresses, used to procure data from the color lookup table referenced above for use as input data for the combined three-dimensional interpolations, are calculated in accordance with the offset address calculation of 3-D interpolation:

$$\text{Offset address} = H*Ti*Tj*Z + I*Tj*Z + J*Z \quad (1)$$

Where: H, I, J are input values;
Th, Ti, Tj are 3-D CLUT table dimensions; and
Z is number output channel.

Equation (1) is then expanded in accordance with the number of channels (N) of the associated device. Thus, equations (2), (3), and (4) shown below, respectively correspond to devices having 4-channels, 5-channels, and 6-channels:

4-channel:

$$\text{Offset address} = H*Ti*Tj*Tk*Z + I*Ti*Tk*Z + J*Tk*Z + K*Z \quad (2)$$

5-channel:

$$\text{Offset address} = H*Ti*Tj*Tk*Tl*Z + I*Tj*Tk*Tl*Z + J*Tk*Tl*Z + K*Tl*Z + L*Z \quad (3)$$

6-channel:

$$\text{Offset address} = H*Ti*Tj*Tk*Tl*Tm*Z + I*Tj*Tk*Tl*Tm*Z + J*Tk*Tl*Tm*Z + K*Tl*Tm*Z + L*Tm*Z + M*Z \quad (4)$$

The skilled artisan will appreciate that further expansion of equation (1) is capable of being undertaken in accordance with the number of channels (N) associated with a given device.

Equations (1), (2), (3), and (4) are capable of being rewritten with an array I[n] to hold the input values H, I, J, K, L, M . . . , and an array T[n] to hold the color lookup table dimensions Th, Ti, Tj, Tk, Tl, Tm . . . , wherein:

3-channel:

Offset address =  I[0] * T[1] * T[2] * Z +    (5)
                 I[1] * T[2] * Z +
                 I[2] * Z 4-channel:

Offset address =  I[0] * T[1] * T[2] * T[3] * Z +    (6)
                 I[1] * T[2] * T[3] * Z +
                 I[2] * T[3] * Z +
                 I[3] * Z 5-channel:

Offset address =  I[0] * T[1] * T[2] * T[3] * T[4] * Z +    (7)
                 I[1] * T[2] * T[3] * T[4] * Z +
                 I[2] * T[3] * T[4] * Z +
                 I[3] * T[4] * Z +
                 I[4] * Z 6-channel:

Offset address =  I[0] * T[1] * T[2] * T[3] * T[4] * T[5] * Z +    (8)
                 I[1] * T[2] * T[3] * T[4] * T[5] * Z +
                 I[2] * T[3] * T[4] * T[5] * Z +
                 I[3] * T[4] * T[5] * Z +
                 I[4] * T[5] * Z +
                 I[5] * Z In accordance with equations (5), (6), (7), and (8), the following function is capable of being used to calculate the offset values, or addresses, for the combined three-dimensional interpolations:

```
int CalcTblOffset(int *Index, unsigned short *TblDim, int InputChan,
    int OutputChan)
{
    int       TblOffset = 0;
    unsigned  short TDim;
    int       i, j;
    for (i = 0; i < InputChan; i++)
    {
        TDim = 1;
        for (j = i + 1; j < InputChan; j++)
            TDim *= TblDim[j];
        TblOffset += Index[i] * TDim * OutputChan;
    }
    return TblOffset;
}
```

From the above function, the following code fragment is capable of being used to calculate the offset values, e.g. offset addresses:

```
int *TblOffset;
int *Index;
unsigned short *TblDim;
int InputChan;
int OutputChan;
...
...
N = (int)pow(2, InputChan);
for (i = 0; i < N; i++)
    TblOffset[i] = CalcTblOffset(Index, TblDim, InputChan,
        OutputChan);
```

Thereafter, retrieval of the appropriate data from the color lookup table is accomplished via application of the following code fragment:

```
unsigned short *Addr[8];
unsigned short *Clut;
float *Fraction;
float *OutputData;
...
...
for (i = 0; i < N/8; i++)
{
    Addr[0] = Clut + TblOffset [i*8];
    Addr[1] = Clut + TblOffset [i*8+1];
    Addr[2] = Clut + TblOffset [i*8+2];
    Addr[3] = Clut + TblOffset [i*8+3];
    Addr[4] = Clut + TblOffset [i*8+4];
    Addr[5] = Clut + TblOffset [i*8+5];
    Addr[6] = Clut + TblOffset [i*8+6];
    Addr[7] = Clut + TblOffset [i*8+7];
    // perform 3-D interpolation
    3-DInterpolation(Addr, Fraction, OutputData, OutputChan);
    ...
}
```

Following the retrieval of the appropriate data from the color lookup table, via the example code fragment above, the $2^N/8$ three-dimensional interpolations required for an N-channel device are performed and the (2 N/8-1)*3 number of linear interpolations required for the N-channel device are performed, resulting in transformed image data. The output transformed image data is then communicated to a single dimensional lookup table, whereupon final output data is obtained by the document processing device 104.

Figure 4:
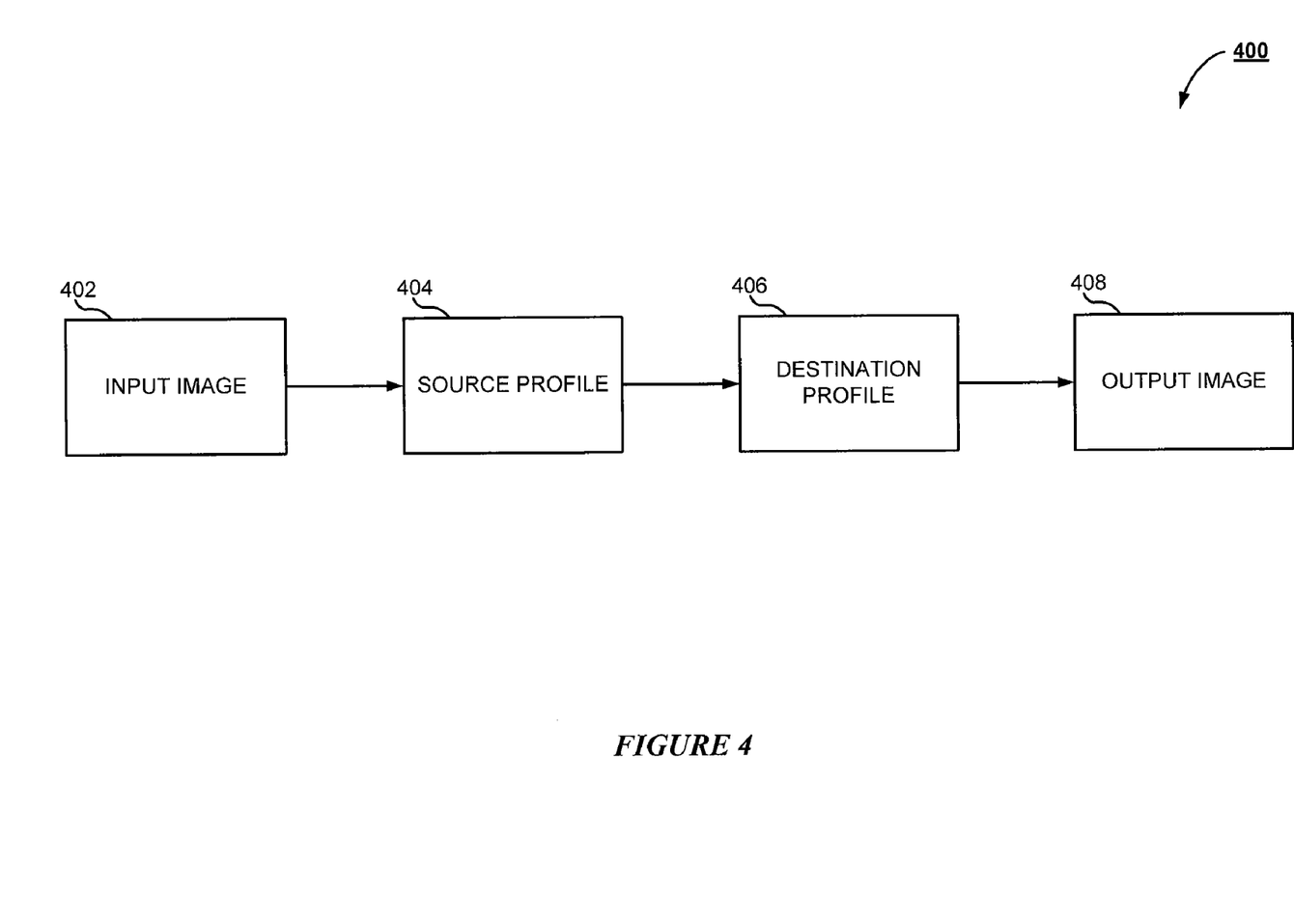
FIG. 4 is a block diagram illustrating color space transformation employing multiple three-dimensional linear interpolations according to one embodiment of the subject application.

The skilled artisan will appreciate that the subject system 100 and components described above with respect to FIG. 1, FIG. 2, and FIG. 3 will be better understood in conjunction with the examples described hereinafter with respect to FIG. 4 and FIG. 5. Turning now to FIG. 4, there is shown a block diagram 400 illustrating the system and method of color space transformation employing multiple three-dimensional linear interpolations in accordance with one embodiment of the subject application. As shown in FIG. 4, the diagram 400 includes an input image 402, a source profile 404, a destination profile 406, and an output image 408. According to one embodiment of the subject application, the input image 402 is representative of any image received by the controller 108 or other suitable component associated with the document processing device 104 having one, three, four, five, six, or up to fifteen channels. The output image 408 is also capable of having one, three, four, five, six, or up to fifteen channels.

The source profile 404 in accordance with one embodiment of the subject application typically comprises one-dimensional lookup tables, a matrix, and a color lookup table. With respect to a gray-scale input, the skilled artisan will appreciate that the corresponding source profile 404 includes a single one-dimensional lookup table. With respect to an RGB input, the corresponding source profile 404 includes three one-dimensional lookup tables. For four to N source profile 404, e.g. ICC profile version 4, the data flow includes (1) one-dimensional lookup tables (A curves), (2) a color lookup table, (3) one-dimensional lookup tables (M curve), (4) a matrix, and (5) one-dimensional lookup tables (B curve). For four to N source profile 404 (ICC version 2), the data flow comprises (1) matrix, (2) one-dimensional lookup tables, (3) color lookup table, and (4) one-dimensional lookup tables The skilled artisan will appreciate that suitable examples of destination profiles 406 include one, three, four, six, and eight color output. For example, a laser-based document processing device is capable of having single channel output, e.g. monochromatic, or four channels (CMYK). Inkjet-based document processing devices are capable of outputting in six channels, e.g. CMYK, light C and light M; or outputting in eight channels, e.g. CMYK, light C, light M, medium gray, and light gray.

Figure 5:
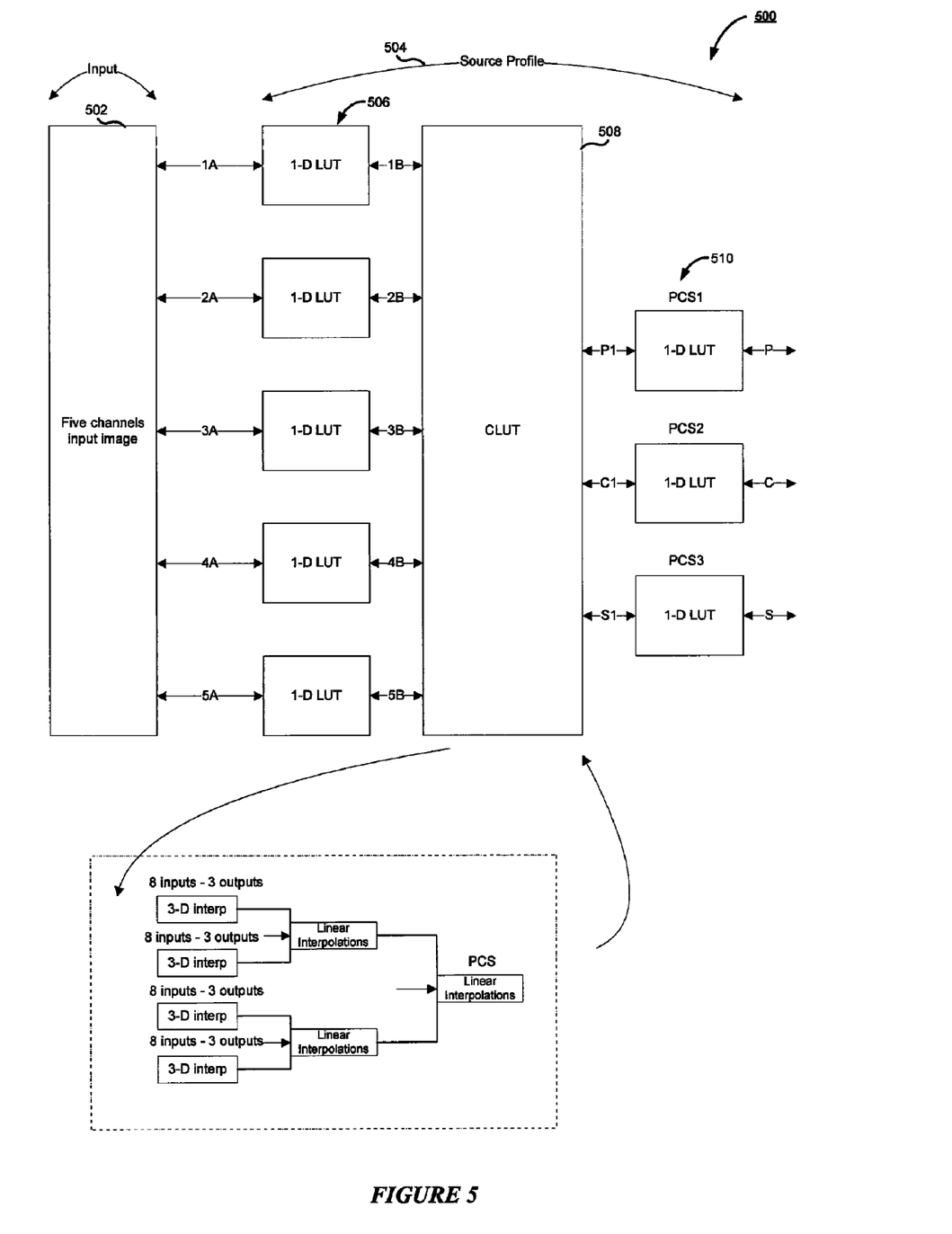
FIG. 5 is a block diagram illustrating color space transformation employing multiple three-dimensional linear interpolations according to one embodiment of the subject application.

Turning now to FIG. 5, there is shown a block diagram 500 illustrating a five-channel input image 502, shown in FIG. 4 as the input image 402. As will be appreciated by those skilled in the art, a five-channel input image 502 will require a corresponding five-channel source profile 504. It will be understood by those skilled in the art that FIG. 5 illustrates a simplified representation of the system employed by the subject application corresponding to a five-channel input image 502. Thus, the diagram 500 source profile 504 (shown in FIG. 4 as the source profile 404) only includes one-dimensional lookup tables 506, a color lookup table 508, and one-dimensional lookup tables 510.

Each of the inputs to the one-dimensional lookup tables 506 of the source profile 504 corresponds to one of the five channels of the input image 502, e.g. 1A, 2A, 3A, 4A, and 5A. The outputs from the five one-dimensional lookup tables 506, e.g. outputs 1B, 2B, 3B, 4B, and 5B, are used as inputs to calculate 32 offset addresses for four three-dimensional interpolations. The skilled artisan will appreciate that the aforementioned outputs 1B, 2B, 3B, 4B, and 5B are used as inputs H, I, J, K, and L in Equation (3) above. It will also be understood by those skilled in the art that one three-dimensional interpolation requires eight (8) inputs and have three (3) outputs. The data of the 32 offset addresses are from the color lookup table 508. The outputs of the linear interpolations (PCS) are then used as inputs (P1, C1, and S1) to one-dimensional lookup tables 510, e.g. tables PCS1, PCS2, and PCS3 shown in FIG. 5. Outputs from the one-dimensional lookup tables 510, e.g. P, C, and S, are then used as inputs to a destination profile 406 of FIG. 4.

Figure 6:
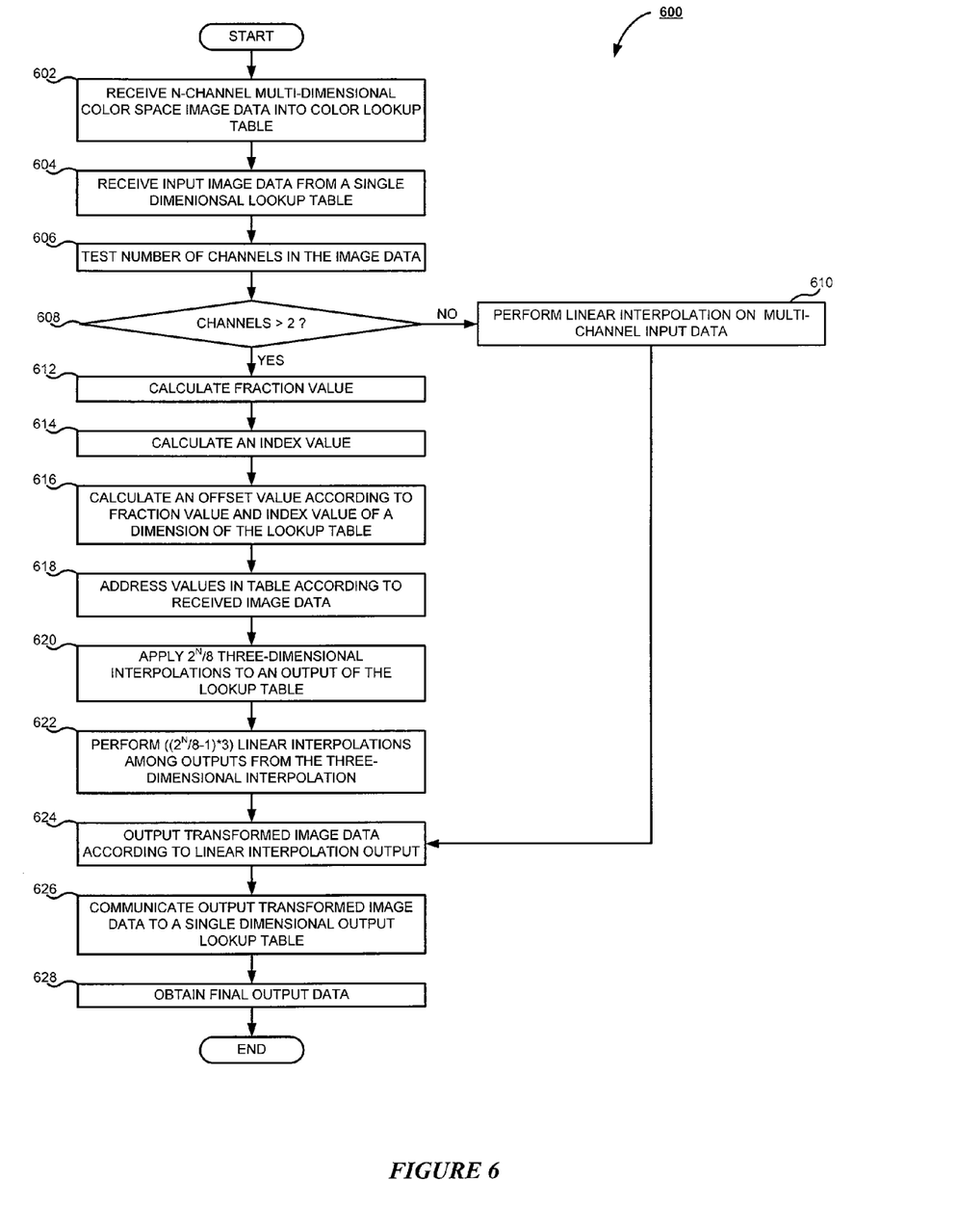
FIG. 6 is a flowchart illustrating a color space transformation method employing multiple three-dimensional linear interpolations according to one embodiment of the subject application.

The skilled artisan will appreciate that the subject system 100 and components described above with respect to FIG. 1, FIG. 2, FIG. 3, FIG. 4, and FIG. 5 will be better understood in conjunction with the methodology described hereinafter with respect to FIG. 6. Referring now to FIG. 6, there is shown a flowchart 600 illustrating a color space transformation method employing multiple three-dimensional linear interpolations in accordance with one embodiment of the subject application. The methodology of FIG. 6 begins at step 602, whereupon the controller 108 or other suitable component associated with the document processing device 104 receives input image data from a single dimensional lookup table. The skilled artisan will appreciate that the multi-channel image data is suitably received from the user device 114, a portable storage medium, facsimile transmission, or other suitable electronic communication of image data to the document processing device 104 via the computer network 102. Preferably, the image data is received into a single dimensional lookup table, as will be understood by those skilled in the art. It will be understood by those skilled in the art that while reference is made herein with respect to the document processing device 104, the user device 114, or any other such computing device is equally capable of being implemented to perform the method set forth in FIG. 6.

N-channel multi-dimensional color space image data, e.g. RGB color space image data, is then received from the single dimensional lookup table at step 604. At step 606, the number of channels in the received image data is tested so as to determine, at step 608, whether the number of channels is greater than two, i.e. N>2. When it is determined at step 608 that the number of channels in the received image data is less than 2, flow proceeds to step 610, whereupon linear interpolation is performed on the multi-channel input data. That is, linear interpolation is performed with respect to received image data having one or two channels. Thereafter, operations proceed to step 624, whereupon the controller 108 or other suitable component associated with the document processing device 104 outputs transformed image data in accordance with the linear interpolation output at step 610. The transformed image data is then communicated, at step 626, to a single dimensional lookup table and final output data is obtained at step 628.

Returning to step 608, upon a determination that the number of channels associated with the received multi-channel image data corresponds to three or more channels, i.e. N>2, a fraction value is calculated in accordance with the received image data at step 612. At step 614, an index value is calculated in accordance with the received image data. The controller 108 or other suitable component associated with the document processing device 104 then calculates, at step 616, an offset value in accordance with the calculated fraction, the calculated index value, and a dimension of the lookup table, as set forth in greater detail above. In accordance with one example embodiment of the subject application, the index value (I) and the fraction value (Fr) are calculated in accordance with a floating point value (F). Thus, for example when a determined floating point value F=3.057, the corresponding index value I=3 and the fraction value Fr=0.057.

At step 618, values in the color lookup table are addressed by the controller 108 or other suitable component associated with the document processing device in accordance with the calculated offset value. Stated another way, the controller 108 or other suitable component associated with the document processing device 104 uses the calculated offset value, or address, to determine where in the color lookup table data for interpolation is to be found. That data is then used for the interpolations discussed hereinafter. At step 620, $2^N/8$ three-dimensional interpolations are applied to an output of the lookup table corresponding to the received image data. That is, the values in the lookup table addressed in accordance with the calculated offset value are used for the $2^N/8$ three-dimensional interpolations of step 620. At step 622, $(2^N/8-1)*3$ linear interpolations are performed by the controller 108 or other suitable component associated with the document processing device 104 among the outputs from the three-dimensional interpolations applied at step 620.

Operations then proceed from step 622 to step 624, whereupon transformed image data is output in accordance with the linear interpolations performed on the outputs from the three-dimensional interpolations. The output transformed image data is then communicated to a single dimensional lookup table at step 626. At step 628, final output data is obtained from the single dimensional lookup table.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A color space transformation system employing multiple three-dimensional linear interpolations comprising:
   a color lookup table including a plurality of entries having values in a multi-dimensional color space corresponding to selected values in an N-channel multi-dimensional color space, wherein N is defined as an integer greater than 2;
   input means for receiving image data in the N-channel multidimensional color space;
   lookup means for addressing values in the color lookup table in accordance with received image data;
   three-dimensional interpolation means for applying $2^N/8$ three-dimensional interpolations to an output of the lookup table corresponding to received image data;
   linear interpolation means for performing $(2^N/8-1)*3$ linear interpolations among outputs from the three-dimensional interpolation means; and
   output means for outputting transformed image data in accordance with an output of the linear interpolation means.

2. The system of claim 1 further comprising:
   testing means for testing a number of channels in the received image data; and
   wherein the linear interpolation means is further for performing linear interpolation on the received image data when a number of channels less than 3 is determined by the testing means.

3. The system of claim 1 further comprising:
   first calculation means for calculating a fraction value in accordance with received image data;
   second calculation means for calculating an index value in accordance with received image data;
   third calculation means for calculating an offset value in accordance with a calculated fraction value, a calculated index value, and a dimension of the color lookup table; and
   wherein the lookup means includes means for addressing values in the color lookup table in accordance with a calculated offset value.

4. The system of claim 1 wherein the received image data is defined in an RGB color space and wherein the transformed image data is defined in CMYK color space.

5. The system of claim 1 wherein each linear interpolation is completed on two distinct outputs from the three-dimensional interpolation means.

6. The system of claim 1 further comprising:
   an input single dimensional lookup table; and
   an output single dimensional lookup table;
   wherein input image data is received from the input lookup table, and wherein the output transformed image data is communicated to the output lookup table from which corresponding final output data is obtained.

7. The system of claim 1 further comprising:
   an input single dimensional lookup table; and
   an output single dimensional lookup table;
   wherein input image data is received from the input lookup table, and wherein the output transformed image data is communicated to the output lookup table from which corresponding final output data is obtained according thereto.

8. A color space transformation method employing multiple three-dimensional linear interpolations comprising the steps of:
   receiving N-channel multi-dimensional color space color image data into a color lookup table including a plurality of entries having values in a multi-dimensional color space corresponding to selected values in an N-channel multi-dimensional color space, wherein N is defined as an integer greater than 2;
   addressing values in the color lookup table in accordance with received image data;
   applying $2^N/8$ three-dimensional interpolations to an output of the lookup table corresponding to received image data;
   performing $(2^N/8-1)*3$ linear interpolations among outputs from the three-dimensional interpolation; and
   outputting transformed image data in accordance with an output of the linear interpolation.

9. The method of claim 8 further comprising the steps of:
   testing a number of channels in received multi-channel image data; and
   performing linear interpolation on multi-channel input data when a number of channels less than 3 are determined by the testing step.

10. The method of claim 8 further comprising the steps of:
    calculating a fraction value in accordance with received image data;
    calculating an index value in accordance with received image data;
    calculating an offset value in accordance with a calculated fraction value, a calculated index value, and a dimension of the color lookup table; and
    wherein the step of addressing values in the color lookup table is in accordance with a calculated offset value.

11. The method of claim 8 wherein the received image data is defined in an RGB color space and wherein the transformed image data is defined in CMYK color space.

12. The method of claim 8 wherein each linear interpolation is completed on two distinct outputs from the three-dimensional interpolation.

13. The method of claim 8 further comprising the steps of:
   receiving input image data from a single dimensional input lookup table; and
   communicating output transformed image data to a single dimensional output lookup table from which corresponding final output data is obtained.

14. A color space transformation system employing multiple three-dimensional linear interpolations comprising:
   a color lookup table including a plurality of entries having values in a multi-dimensional color space corresponding to selected values in an N-channel multi-dimensional color space, wherein N is defined as an integer greater than 2;
   an input to receive image data in the N-channel multi-dimensional color space;
   a color lookup table to address values in accordance with received image data;
   a controller including a three-dimensional interpolator to apply $2^N/8$ three-dimensional interpolations to an output of the lookup table corresponding to received image data, a linear interpolator to perform $(2^N/8-1)*3$ linear interpolations among outputs from the three-dimensional interpolator; and
   an output to output transformed image data in accordance with an output of the linear interpolator.

15. The system of claim 14 further comprising:
   a comparator to test a number of channels in the received image data,
   wherein the linear interpolator performs linear interpolation on the received image data when a number of channels less than 3 is determined by the comparator.

16. The system of claim 14 further comprising:
   a calculator to calculate a fraction value in accordance with received image data, an index value in accordance with received image data, and an offset value in accordance with the calculated fraction value, the calculated index value, and a dimension of the color lookup table; and
   wherein the color lookup table is also to address values in accordance with a calculated offset value.

17. The system of claim 14 wherein the received image data is defined in an RGB color space and wherein the transformed image data is defined in CMYK color space.

18. The system of claim 14 wherein each linear interpolation is completed on two distinct outputs from the three-dimensional interpolator.

* * * * *